United States Patent
Zhao

(10) Patent No.: US 11,962,361 B2
(45) Date of Patent: Apr. 16, 2024

(54) METHODS, APPARATUSES, DEVICE AND STORAGE MEDIUM FOR CONTROLLING TRANSMITTED POWER OF SIDELINK COMMUNICATION

(71) Applicant: Beijing Xiaomi Mobile Software Co., Ltd., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 369 days.

(21) Appl. No.: 17/624,727

(22) PCT Filed: Jul. 5, 2019

(86) PCT No.: PCT/CN2019/094952
§ 371 (c)(1),
(2) Date: Jan. 4, 2022

(87) PCT Pub. No.: WO2021/003626
PCT Pub. Date: Jan. 14, 2021

(65) Prior Publication Data
US 2022/0255643 A1 Aug. 11, 2022

(51) Int. Cl.
*H04B 17/318* (2015.01)
*H04W 4/40* (2018.01)

(52) U.S. Cl.
CPC ............ *H04B 17/318* (2015.01); *H04W 4/40* (2018.02)

(58) Field of Classification Search
CPC ........ H04B 17/318; H04W 4/40; H04W 4/46; H04W 52/242; H04W 52/383; H04W 4/44
See application file for complete search history.

(56) References Cited

U.S. PATENT DOCUMENTS 9,338,807 B2  5/2016  Kwon et al.
9,572,113 B2  2/2017  Kwon et al.
(Continued)

FOREIGN PATENT DOCUMENTS

CN    103139889 A    6/2013
CN    104113832 A    10/2014
(Continued)

OTHER PUBLICATIONS

State Intellectual Property Office of the People's Republic of China, Office Action and Search Report Issued in Application No. 2019800012457, dated Sep. 2, 2021, 24 pages.
(Continued)

*Primary Examiner* — Hashim S Bhatti
(74) *Attorney, Agent, or Firm* — Volpe Koenig

(57) ABSTRACT

The present disclosure relates to methods for controlling a transmitted power of a sidelink communication and belongs to the communication field. The method includes the followings: when V2X communication is conducted between a first UE and a second UE, the first UE obtains a transmitted power of a reference signal from the second UE and measures a received power of receiving the reference signal by the second UE; the first UE determines a path loss based on a difference between the received power and the transmitted power of the reference signal, and determines a transmitted power of the first UE conducting V2X communication with the second UE based on the path loss.

20 Claims, 7 Drawing Sheets

(56) References Cited

U.S. PATENT DOCUMENTS

| | | |
|---|---|---|
| 9,769,765 B2 | 9/2017 | Kwon et al. |
| 2013/0244715 A1 | 9/2013 | Kwon |
| 2014/0274196 A1 | 9/2014 | Dai et al. |
| 2016/0227488 A1 | 8/2016 | Kwon et al. |
| 2017/0111870 A1 | 4/2017 | Kwon |
| 2018/0199294 A1* | 7/2018 | Wang .................. H04W 52/325 |
| 2018/0227971 A1 | 8/2018 | Yasukawa et al. |
| 2018/0352404 A1 | 12/2018 | Yi et al. |
| 2019/0028974 A1 | 1/2019 | Wang et al. |
| 2020/0187128 A1* | 6/2020 | Yao ..................... H04W 52/242 |

FOREIGN PATENT DOCUMENTS

| | | |
|---|---|---|
| CN | 104205954 A | 12/2014 |
| CN | 105323839 A | 2/2016 |
| CN | 107040865 A | 8/2017 |
| CN | 107852777 A | 3/2018 |
| CN | 108207024 A | 6/2018 |
| CN | 108702244 A | 10/2018 |
| CN | 109392069 A | 2/2019 |
| KR | 20180132284 A | 12/2018 |

OTHER PUBLICATIONS

ISA State Intellectual Property Office of the People's Republic of China, International Search Report Issued in Application No. PCT/CN2019/094952, dated Mar. 13, 2020, WIPO, 4 pages.
Samsung et.al, "On Sidelink Power Control," 3GPP TSG RAN WG1 #97, R1-1906950, Samsung, May 4, 2019, 8 pgs.

* cited by examiner

METHODS, APPARATUSES, DEVICE AND STORAGE MEDIUM FOR CONTROLLING TRANSMITTED POWER OF SIDELINK COMMUNICATION

REFERENCE TO RELATED APPLICATION

This application is a National Stage of International Application No. PCT/CN2019/094952, filed on Jul. 5, 2019, the contents of all of which are incorporated herein by reference in their entirety.

TECHNICAL FIELD

The present disclosure relates to communication field, and in particular to methods, apparatuses, device and storage medium for controlling a transmitted power of a sidelink communication.

BACKGROUND

Vehicle to everything (V2X) communication implements a sidelink communication between two terminals.

In a new radio (NR) Uu communication, control of a transmitted power of an uplink signal of a user equipment is supported. Illustratively, a user equipment measures a downlink reference signal from a base station and obtains a measuring result and estimates a path loss from the base station to the user equipment based on the measuring result.

SUMMARY

One or more embodiments of the present disclosure provide methods, apparatuses, device and system for controlling a transmitted power of a sidelink communication. The technical solution is described below.

According to an aspect of embodiments of the present disclosure, there is provided a method of controlling a transmitted power of a sidelink communication, which is applied to a first user equipment (UE) in a vehicle to everything (V2X). The method includes:

obtaining, by the first UE, a first transmitted power of a second UE sending a reference signal;

measuring, by the first UE, a received power of the second UE sending the reference signal;

determining, by the first UE, a path loss based on a difference between the first transmitted power and the received power of the reference signal;

determining, by the first UE, a second transmitted power of the first UE conducting V2X communication with the second UE based on the path loss.

According to another aspect of embodiments of the present disclosure, there is provided a method of controlling a transmitted power of a sidelink communication, which is applied to a first UE in a V2X. The method includes:

measuring, by the first UE, a received power of a reference signal sent by a second UE;

sending, by the first UE, the received power to the second UE;

receiving, by the first UE, a path loss from the second UE, wherein the path loss is determined by the second UE for the first UE conducting V2X communication with the second UE;

determining, by the first UE, a transmitted power of the first UE conducting V2X communication with the second UE based on the path loss.

According to another aspect of embodiments of the present disclosure, there is provided a method of controlling a transmitted power of a sidelink communication, which is applied to a second UE in a V2X. The method includes:

sending, by the second UE, a reference signal to a first UE;

receiving, by the second UE, a received power of the reference signal from the first UE, wherein the received power is a received power measured by the first UE when the first UE receives the reference signal;

determining, by the second UE, a path loss based on a difference between the received power and a transmitted power of sending the reference signal;

sending, by the second UE, the path loss to the first UE.

According to another aspect of embodiments of the present disclosure, there is provided a terminal. The terminal includes:

a processor;

a transceiver connected to the processor;

where the processor is configured to load and execute executable instructions to implement the method of controlling a transmitted power of a sidelink communication according to the above various aspects.

According to another aspect of embodiments of the present disclosure, there is provided a computer readable storage medium. The computer readable storage medium stores at least one instruction, at least one segment of program, a code set or an instruction set, and the at least one instruction, the at least one segment of program, the code set or the instruction set is loaded and executed by a processor to implement the method of controlling a transmitted power of a sidelink communication according to the above various aspects.

The technical solution provided by the embodiments of the present disclosure has the following beneficial effects.

It should be understood that the above general descriptions and subsequent detailed descriptions are merely illustrative and explanatory rather than limiting of the present disclosure.

BRIEF DESCRIPTION OF THE DRAWINGS

To describe the technical solutions in embodiments of the present disclosure more clearly, drawings required in descriptions of the examples of the present disclosure will be briefly introduced below. It is apparent that the drawings described below are merely examples of the present disclosure and other drawings may be obtained by those of ordinary skill in the prior art based on these drawings without making creative work.

DETAILED DESCRIPTION OF THE EMBODIMENTS

Figure 1:
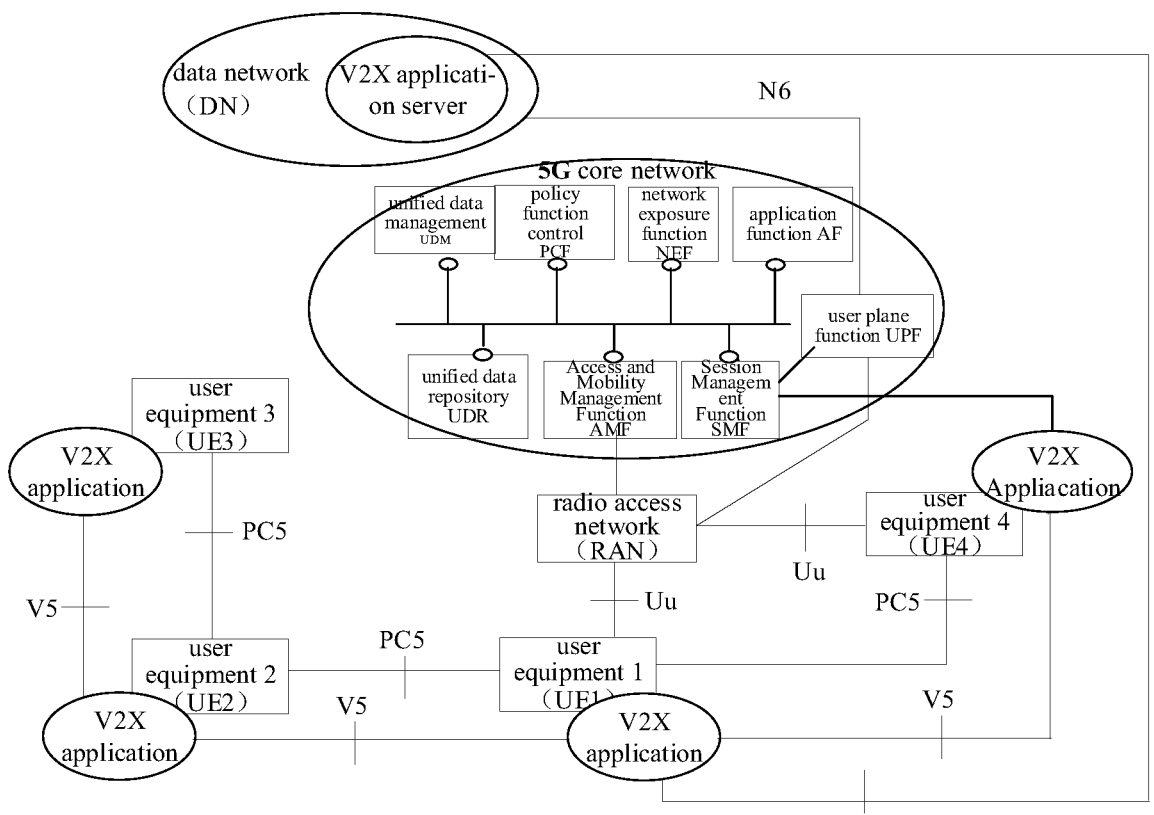
FIG. 1 is a structural block diagram illustrating a communication system supporting a sidelink communication according to an embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

In the Rel-14/15 of Long Term Evolution (LTE), support of a cellular network for a vehicle to everything (V2X) communication is provided, i.e., Cellular based V2X (C-V2X). In the C-V2X, communication between a vehicle-mounted device and another device is relayed through a base station or a core network, namely, communication is conducted by using a communication link between a terminal and a base station in the original cellular network (UL/UD); or, communication is conducted by using a sidelink between the vehicle-mounted device and another device (sidelink communication). Compared with the Uu interface, sidelink communication features short delay and small overhead and the like, and therefore may be applied to direction communication between a vehicle-mounted device and another peripheral device geographically approximate to the vehicle-mounted device.

In the LTE system, the V2X sidelink communication can only support some V2X applications of basic safety, for example, communicate Basic Safety Message (BSM) such as Cooperative Awareness Messages (CAM) or Decentralized Environmental Notification Message (DENM). Recently, along with development of technologies such as self-driving technology, in order to support new V2X services, new requirements are raised for the performance of the V2X technology. It has become a major content to support new V2X communication services and scenarios using 5G NR technology. In related arts, some new service requirements to be met by the V2X communication are set, including vehicles platooning, extended sensors, advanced driving and remote driving. Generally, the NR V2X sidelink communication needs to provide higher communication rate, shorter communication delay and more reliable communication quality.

In the discussions of NR V2X, RAN1 resolution supports the unicast and multicast services of the sidelink communication to use a feedback repeat mechanism of physical layer Hybrid Automatic Repeat request (HARQ). Further, in order to reduce interference, for a unicast communication, control of a transmitted power based on a path loss from a sender user equipment (UE) to a receiver UE is supported. For example, it is supported that the receiver UE reports SideLink-Reference Signal Received Power (SL_RSRP) to the sender UE and the sender UE estimates the path loss. For a multicast communication, no resolution is made as to whether power control is supported.

In the NR Uu communication, control of the transmitted power of the UE uplink signal is supported. The UE estimates the path loss from a base station to the UE based on a measuring result of a downlink reference signal, and then calculates a transmitted power based on the path loss. Illustratively, the transmitted power is calculated by the following equation:

$$P=\min\{P_{max}, P_0+\alpha*PL(\text{in dB})+\Delta\};$$

$$PL=RSRP-\text{higher layer filtered RSRP};$$

where P is a transmitted power, $P_{max}$ is a maximum power limit, $\alpha$ and $P_0$ are configured parameters, PL is a path loss, $\Delta$ is other power-control-related items, RSRP is a transmitted power of the sender UE sending the reference signal, and higher layer filtered RSRP is a received power of the receiver UE receiving the reference signal.

NR V2X supports HARQ feedback of unicast and multicast communications and Channel State Information (CSI) feedback of at least unicast communication. Power control for the feedback transmission can reduce signal interference of the entire system and increase communication efficiency of the system. However, for the unicast communication, the transmitted power of the sender UE is variable, and thus the SL-RSRP measured by the receiver UE needs to be reported to the sender UE such that the sender UE may estimate a path loss from the sender UE to the receiver UE based on its own transmitted power. Different from the uplink power control (the transmitted power of the base station is invariable), the receiver UE cannot estimate the path loss based directly on the measuring result, and thus cannot perform power control of feedback transmission based on the path loss. For the multicast communication, when the sender UE uses power control, the same problem as the unicast communication will also occur.

The present disclosure provides a method of controlling a transmitted power of a sidelink communication to solve the problem that the receiver UE cannot estimate the path loss based directly on the measuring result, leading to inability to perform power control of feedback transmission based on the path loss.

FIG. 1 is a block diagram illustrating a communication system according to an embodiment of the present disclosure. The communication system may be a Non-roaming 5G system architecture which may be applied to a vehicle to everything (V2X) service employing D2D technology.

The system architecture includes Data Network (DN) in which a V2X application server required by a V2X service is disposed. The system architecture further includes a 5G core network. The network functions of the 5G core network includes: Unified Data Management (UDM), Policy Control Function (PCF), Network Exposure Function (NEF), Application Function (AF), Unified Data Repository (UDR), Access and Mobility Management Function (AMF), Session Management Function (SMF), and User Plane Function (UPF).

The system architecture further includes New Generation-Radio Access Network (NG-RAN) and four illustrated user equipments (i.e. user equipment 1 to user equipment 4). Each user equipment is provided with a V2X application.

One or more access network devices, for example, base stations (gNB) are disposed in the radio access network.

In the system architecture, the data network and the user plane function in the 5G core network are connected via an N6 reference point, and the V2X application server and the V2X application in the user equipment are connected via a V1 reference point; the radio access network is connected with the AMF function and the UPF function in the 5G core network, and the radio access network is connected with the user equipment 1 and the user equipment 5 respectively via a Uu reference point; sidelink communication is conducted among more than one user equipments via PC5 reference point, and more than one V2X applications are connected with each other via a V5 reference point.

Figure 2:
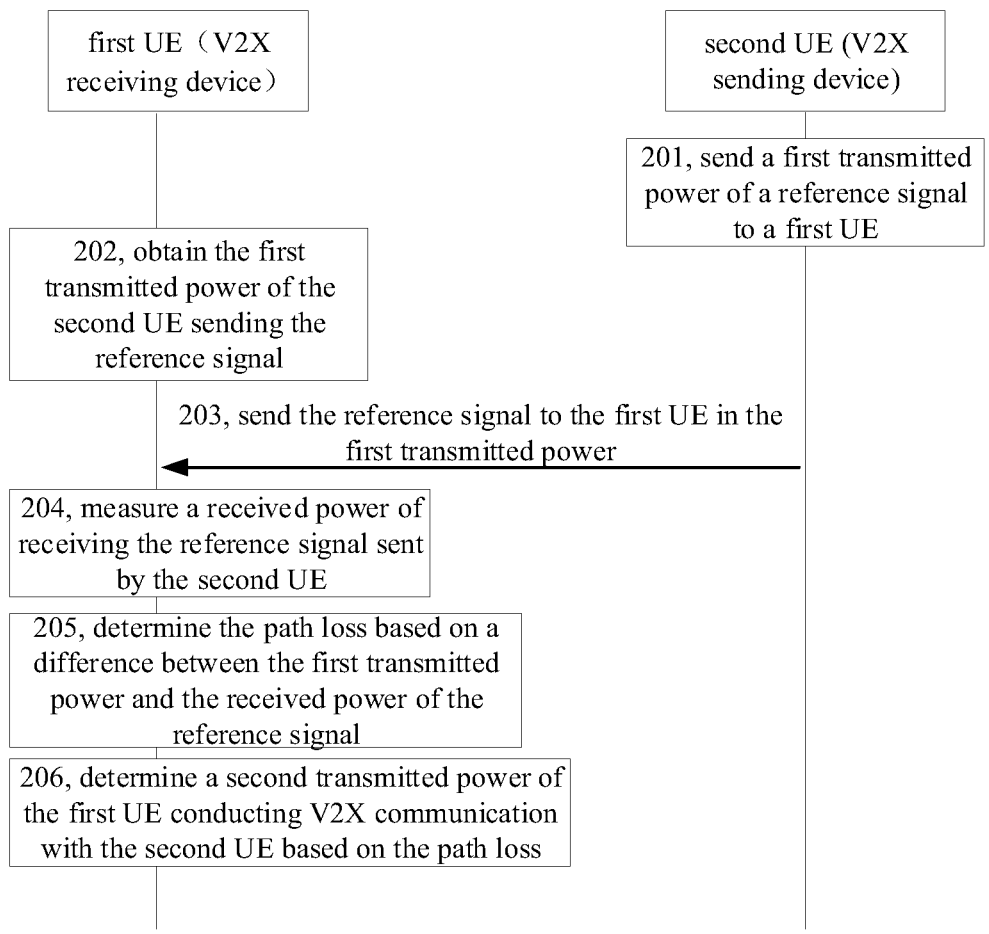
FIG. 2 is a flowchart illustrating a method for controlling a transmitted power of a sidelink communication according to an embodiment of the present disclosure.

FIG. 2 shows a method for controlling a transmitted power of a sidelink communication according to an embodiment of the present disclosure, which is applied to a UE in a V2X. The method includes the following steps.

At step 201, a second UE sends a first transmitted power of a reference signal to a first UE.

The second UE is a sender user equipment and the first UE is a receiver user equipment. The first transmitted power of the reference signal is used by the first UE to determine a second transmitted power of the first UE conducting V2X communication with the second UE.

After the second UE sends information to the first UE, the first UE needs to perform information reception feedback to the second UE. When the first UE sends feedback information, the first UE performs power control for a transmitted power of the feedback information. For example, in the feedback repeat mechanism of physical layer HARQ, in response to receiving information from the second UE, the first UE feeds ACK or NACK back to the second UE, and performs power control for a transmitter power in which ACK or NACK is sent to the second UE.

In order to perform power control for the transmitted power, the first UE needs to determine a path loss between the first UE and the second UE. The reference signal and the transmitted power of the reference signal are used by the first UE to determine the path loss between the first UE and the second UE. Because the transmitted power of the reference signal of the second UE is variable, before the first UE determines the path loss, the second UE sends the transmitted power of the reference signal to the first UE.

At step 202, the first UE obtains the first transmitted power of the second UE sending the reference signal.

Merely illustratively, the first UE receives first control information from the second UE. The first control information includes the transmitted power of the reference signal, and the transmitted power of the reference signal is a transmitted power of the second UE sending the reference signal to the first UE.

Merely illustratively, the above first control information includes at least one of:
physical layer control information on a sidelink;
control information of a media access control (MAC) layer;
control information of a radio resource control (RRC) layer.

Merely illustratively, the manner in which the first UE receives the first control information from the second UE includes at least one of:

1) the first UE receives the first control information sent by the second UE through a physical sidelink control channel (PSCCH), or, 2) the first UE receives the first control information sent by the second UE through a physical sidelink shared channel (PSSCH).

At step 203, the second UE sends the reference signal to the first UE in the above first transmitted power.

At step 204, the first UE measures a received power of the second UE sending the reference signal.

The first UE receives the reference signal from the second UE and measures the received power of the second UE sending the reference signal is received. The received power of the above reference signal is used by the first UE to determine the path loss between the first UE and the second UE.

At step 205, the first UE determines the path loss based on a difference between the first transmitted power and the received power of the reference signal.

Illustratively, the first UE calculates the path loss between the first UE and the second UE in the following equation:

$$PL=RefPower-SL\_RSRP;$$

where RefPower is the transmitted power of the reference signal, SL_RSRP is the received power of the reference signal, and PL is the path loss.

At step 206, the first UE determines a second transmitted power of the first UE conducting V2X communication with the second UE based on the path loss.

Merely illustratively, the first UE determines the transmitted power of the first UE sending the feedback information to the second UE based on the path loss.

For example, the first UE determines the transmitted power of the first UE sending the feedback information of HARQ to the second UE based on the path loss; or the first UE determines the transmitted power of the first UE sending the feedback information of CSI to the second UE based on the path loss.

Illustratively, the first UE calculates the transmitted power of the above first UE based on the path loss in the following equation:

$$P=\min\{P_{max}, P_0+\alpha*PL(\text{in dB})+\Delta\};$$

where P is the transmitted power, $P_{max}$ is the maximum power limit, $\alpha$ and $P_0$ are configured parameters, PL is the path loss, and $\Delta$ is other power-control-related items.

In one word, in the method for controlling a transmitted power of a sidelink communication according to the embodiments of the present disclosure, when V2X communication is conducted between the first UE and the second UE, the second UE sends a reference signal and a first transmitted power of the reference signal to the first UE; the first UE obtains the first transmitted power of the reference signal from the second UE, and measures a received power of receiving the reference signal sent by the second UE; the first UE determines a path loss based on a difference between the first transmitted power and the received power of the reference signal, and determines a transmitted power of the first UE conducting V2X communication with the second UE based on the path loss. This method solves the problem that because the transmitted power of the signal of the sender UE is variable, the receiver UE cannot estimate the path loss based directly on the measuring result, such that the receiver UE can performs power control of signal transmission based on the path loss. For example, the receiver UE can achieve power control of feedback transmission in a sidelink communication by the above method.

It is noted that, when the first UE receives the reference signal and the first transmitted power of the reference signal from the second UE, the first UE determines a second transmitted power of the first UE conducting V2X communication with the second UE based on the embodiment of FIG. 2. Based on the embodiment of FIG. 2, when the first UE receives the reference signal from the second UE but does not receive the first transmitted power of the reference signal, the first UE may obtain the transmitted power of the second UE sending the reference signal in one of the following manners.

In a first manner, the first UE obtains a transmitted power of the reference signal configured by an access network device.

For the first UE conducting V2X communication with the second UE, the access network device configures the transmitted power of the reference signal for the first UE and the second UE in the following illustrative steps:

1) the access network device sends the transmitted power of the reference signal to the first UE and the second UE respectively through a downlink signaling;

2) the first UE receives the transmitted power of the reference signal from the access network device and the second UE receives the transmitted power of the reference signal from the access network device.

After the first UE and the second UE obtain the transmitted power of the reference signal configured by the access network device, the second UE sends the reference signal to the first UE in the transmitted power of the reference signal configured by the access network device; the first UE receives the reference signal from the second UE, and measures a received power of receiving the reference signal sent by the second UE.

In a second manner, the first UE obtains a pre-configured transmitted power of the reference signal.

For the first UE conducting V2X communication with the second UE, the access network device, or the second UE or the first UE pre-configures the transmitted power of the reference signal for V2X communication between the first UE and the second UE, and the first UE and the second UE stores the pre-configured power of the reference signal; when the first UE determines the path loss, the first UE may directly obtain the stored preconfigured transmitted power of the reference signal.

For example, the second UE pre-configurates a transmitted power of a reference signal for V2X communication between the first UE and the second UE within a particular time period, for example, as 20 dB; within the time period, the second UE sends the reference signal to the first UE in the transmitted power of 20 dB, and the first UE determines a path loss of sidelink communication between the first UE and the second UE based on the transmitted power 20 dB and a received power of the reference signal obtained by measuring.

In a third manner, the first UE obtains a pre-defined transmitted power of the reference signal.

For the first UE conducting V2X communication with the second UE, the first UE pre-stores a pre-defined transmitted power of the reference signal. The above pre-defined transmitted power of the reference signal is a transmitted power of the reference signal pre-defined by the first UE for sidelink communication between the first UE and the second UE.

In one word, in the method for controlling a transmitted power of a sidelink communication according to the embodiments of the present disclosure, by any one of the three methods of obtaining the transmitted power of the reference signal, the receiver UE can still determine the path loss of a sidelink communication between the sender UE and the receiver UE in a case of failing to obtain the transmitted power of the reference signal from the sender UE, thus determining a transmitted power in which V2X communication is conducted between the sender UE and the receiver UE based on the path loss, and achieving power control of the signal transmission.

It is further noted that the obtaining of the transmitted power of the reference signal from the second UE by the first UE may be replaced with any one of the above obtaining methods of the transmitted power of the reference signal to become a separate embodiment which can be implemented without relying on the condition of "when the first UE receives the reference signal from the second UE but does not receive the transmitted power of the reference signal", and always implemented by the method for controlling a transmitted power of a sidelink communication by any one of the methods of obtaining the transmitted power of the reference signal.

It is further noted that when the first UE receives the reference signal but does not receive the transmitted power of the reference signal, or when the first UE does not receive the reference signal but receives the transmitted power of the reference signal, or when the first UE does not receive the reference signal and the transmitted power of the reference signal, the first UE may determine the path loss of the present communication by using the path loss of another communication between the first UE and the second UE. Illustratively, a first communication (another communication) and a second communication (present communication) are conducted between the first UE and the second UE, and the first and second communications are communications on different sidelinks between the first UE and the second UE, with the following steps shown in FIG. 3.

At step 301, the second UE sends a first transmitted power of a reference signal to the first UE.

The second UE sends a first transmitted power of a reference signal of the first communication to the first UE; the reference signal of the first communication is used by the first UE to determine a second transmitted power of the first UE conducting the second communication with the second UE.

Merely illustratively, when the first communication includes a first unicast communication, the second UE sends a transmitted power of a reference signal of the first unicast communication to the first UE.

When the first communication does not include the first unicast communication, the second UE does not need to send the transmitted power of the reference signal of the first communication to the first UE.

At step 302, the first UE obtains the first transmitted power of the second UE sending the reference signal.

The first UE obtains the transmitted power of the second UE sending the reference signal of the first communication.

Merely illustratively, when the first communication includes the first unicast communication, the first UE receives a transmitted power of a reference signal of the first unicast communication from the second UE.

When the first communication includes a first multicast communication, the first UE obtains a transmitted power of a reference signal of the first multicast communication.

When the first communication includes a first broadcast communication, the first UE obtains a transmitted power of a reference signal of the first broadcast communication.

Merely illustratively, the transmitted power of the reference signal of the first multicast communication or the first broadcast communication is pre-configured or pre-defined.

The first UE stores the preconfigured or pre-defined transmitted power of the reference signal of the first multicast communication or the first broadcast communication. When the first UE determines a path loss, the first UE may directly obtain the above stored transmitted power of the reference signal of the first multicast communication or the first broadcast communication.

At step 303, the second UE sends the reference signal to the first UE in the above first transmitted power.

The second UE sends the reference signal of the first communication to the first UE in the above first transmitted power.

Merely illustratively, the above transmitted power may include at least one of:

the transmitted power of the reference signal of the first unicast communication;

the transmitted power of the reference signal of the first multicast communication;

the transmitted power of the reference signal of the first broadcast communication.

Correspondingly, the reference signal may include at least one of:

the reference signal of the first unicast communication;
the reference signal of the first multicast communication;
the reference signal of the first broadcast communication.

At step 304, the first UE measures a received power of receiving the reference signal sent by the second UE.

The first UE receives the reference signal of the first communication from the second UE and measures the received power of receiving the reference signal of the first communication sent by the second UE. The received power of the reference signal of the first communication is used by the first UE to determine a path loss of the first communication between the first UE and the second UE.

Merely illustratively, the above received power includes at least one of:

the received power of the reference signal of the first unicast communication;

the received power of the reference signal of the first multicast communication;

the received power of the reference signal of the first broadcast communication.

At step 305, the first UE determines the path loss of the first communication based on a difference between the first transmitted power and the received power of the reference signal of the first communication.

Merely illustratively, when the first communication includes the first unicast communication, the first UE determines a difference between the transmitted power and the received power of the reference signal of the first unicast communication as the path loss of the first communication.

When the first communication includes the first multicast communication, the first UE determines a difference between the transmitted power and the received power of the reference signal of the first multicast communication as the path loss of the first communication.

When the first communication includes the first broadcast communication, the first UE determines a difference between the transmitted power and the received power of the reference signal of the first broadcast communication as the path loss of the first communication.

Merely illustratively, V2X communication conducted between the first UE and the second UE includes at least two first communications. Determining, by the first UE, the path loss of the first communication includes the following illustrative steps.

1) The first UE determines at least two candidate path losses of the first communications respectively based on the differences of the transmitted powers and the received powers of the reference signals of the at least two first communications.

Merely illustratively, the combination of the at least two first communications includes at least one of:

the first unicast communication;
the first multicast communication;
the first broadcast communication;
the first unitcast communication and the first multicast communication;
the first unitcast communication and the first broadcast communication;
the first multicast communication and the first broadcast communication;
the first unitcast communication, the first multicast communication and the first broadcast communication.

2) The first UE determines the path loss of the first communication from the at least two candidate path losses.

Merely illustratively, the first UE determines the path loss of the first communication from the at least two candidate path losses based on a priority sequence; or, the first UE obtains the path loss of the first communication by performing weighted averaging for the at least two candidate path losses; or, the first UE determines the path loss of the first communication randomly from the at least two candidate path losses.

Illustratively, V2X communication conducted between the first UE and the second UE includes one first unicast communication and one first multicast communication.

The first UE determines a difference between the transmitted power and the received power of the reference signal of the first unicast communication as a first candidate path loss; and determines a difference between the transmitted power and the received power of the reference signal of the first multicast communication as a second candidate path loss.

In some embodiments, a priority sequence of "unicast>multicast>broadcast" is set in the first UE, and the first UE determines the first candidate path loss as the path loss of the first communication.

In some embodiments, a weight combination of path losses of unicast, multicast and broadcast is set in the first UE. As shown in Table 1, the first UE determines the weight of the first candidate path loss as 0.6, and the weight of the second candidate path loss as 0.4. In this case, the first UE obtains a first product of the first candidate path loss and 0.6 and a second product of the second candidate path loss and 0.4, and then determines a sum of the first product and the second product as the path loss of the first communication.

TABLE 1

| Combination | Unicast | Multicast | Broadcast |
| --- | --- | --- | --- |
| 1 | 0.6 | 0.4 | 0 |
| 2 | 0.7 | 0 | 0.3 |
| 3 | 0 | 0.55 | 0.45 |
| 4 | 0.5 | 0.3 | 0.2 |

In some embodiments, the first UE determines the first candidate path loss or the second candidate path loss as the path loss of the first communication randomly.

At step 306, the first UE determines the path loss of the first communication as the path loss of the second communication.

The second communication is a second unicast communication. Thus, the corresponding combinations of the first communication and the second communication may include any one of:

the first communication includes the first unicast communication, and the second communication includes the second unicast communication;

the first communication includes the first multicast communication, and the second communication includes the second unicast communication;

the first communication includes the first broadcast communication, and the second communication includes the second unicast communication;

the first communication includes the first unicast communication and the first multicast communication, and the second communication includes the second unicast communication;

the first communication includes the first unicast communication and the first broadcast communication, and the second communication includes the second unicast communication;

the first communication includes the first multicast communication and the first broadcast communication, and the second communication comprises the second unicast communication;

the first communication includes the first unicast communication, the first multicast communication, and the first broadcast communication, and the second communication includes the second unicast communication.

At step 307, the first UE determines a second transmitted power of the first UE conducting V2X communication with the second UE based on the path loss.

Merely illustratively, the first UE determines a transmitted power of the first UE sending the feedback information to the second UE based on the path loss.

For example, the first UE determines a transmitted power of the first UE sending the feedback information of HARQ to the second UE based on the path loss; or, the first UE determines a transmitted power of the first UE sending the feedback information of SCI to the second UE based on the path loss.

In one word, in the method for controlling a transmitted power of a sidelink communication according to the embodiments of the present disclosure, when the receiver UE does not receive the reference signal or the transmitted power of the reference signal, the receiver UE may determine the path loss of the present communication based on the path loss of another communication between the receiver UE and the sender UE, thereby determining the transmitted power in which V2X communication is conducted between the sender UE and the receiver UE based on the path loss, and achieving power control of signal transmission.

Figure 3:
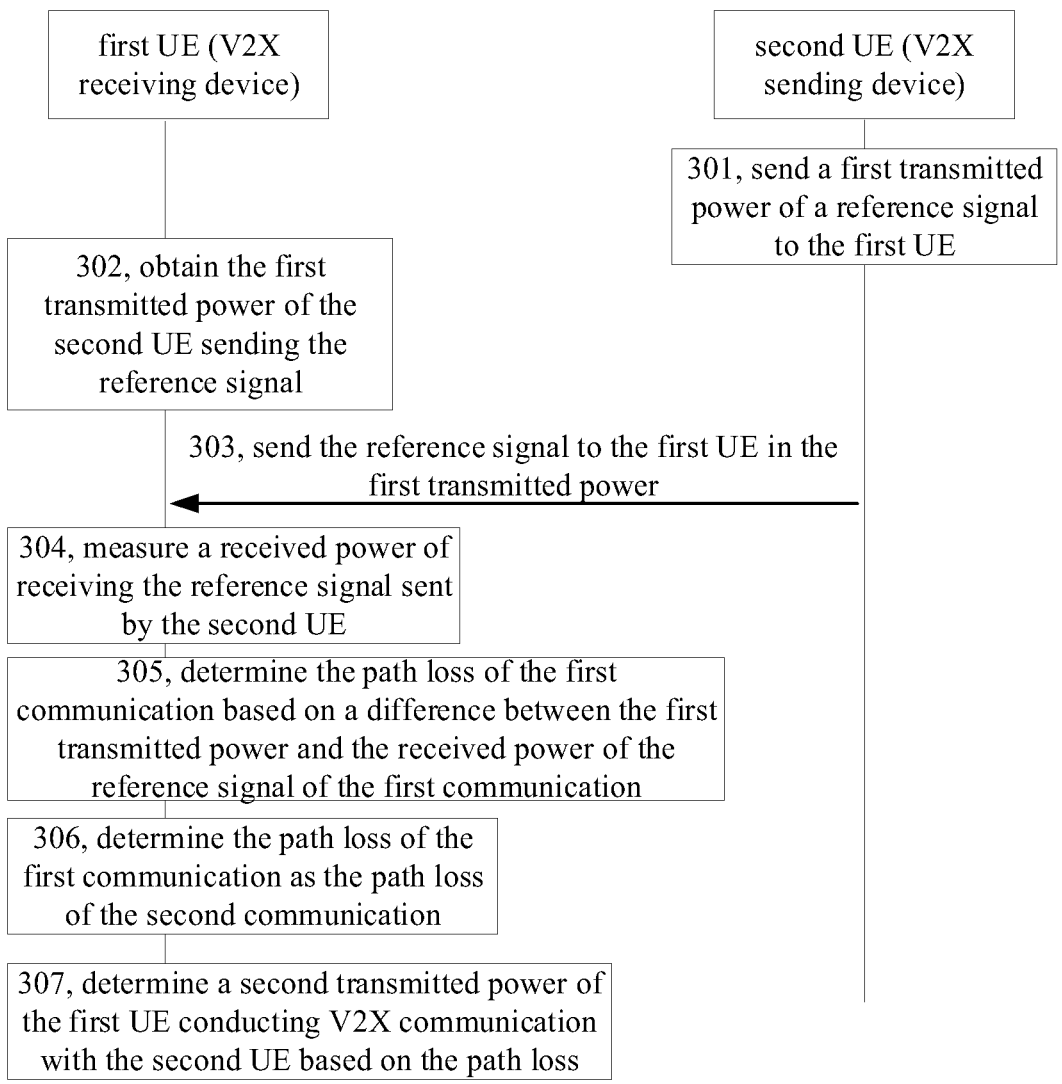
FIG. 3 is a flowchart illustrating a method for controlling a transmitted power of a sidelink communication according to another embodiment of the present disclosure.

It is noted that, based on the embodiment of FIG. 3, when the first UE receives the reference signal but does not receive the transmitted power of the reference signal, or when the first UE does not receive the reference signal but receives the transmitted power of the reference signal, or when the first UE does not receive the reference signal and the transmitted power of the reference signal, the first UE may also obtain the path loss in one of the following manners.

In a first manner, the first UE obtains a path loss configured by an access network device.

For the first UE conducting V2X communication with the second UE, the access network device configures a path loss for the first UE. Illustratively, the first UE receives the path loss from the access network device, and determines the path loss as the path loss of a sidelink communication between the first UE and the second UE.

In a second manner, the first UE obtains a pre-configured path loss.

Merely illustratively, the pre-configured path loss is a path loss pre-configured by the first UE, or the second UE, or the access network device for the sidelink communication between the first UE and the second UE.

Illustratively, the pre-configured path loss is a path loss configured by the second UE for the first UE according to a historical path loss of the sidelink communication between the first UE and the second UE.

In a third manner, the first UE obtains a pre-defined path loss.

The first UE stores the pre-defined path loss. The pre-defined path loss is a path loss pre-defined in the first UE for the sidelink communication between the first UE and the second UE.

In one word, in the method for controlling a transmitted power of a sidelink communication according to the embodiments of the present disclosure, when the receiver UE does not receive the reference signal or the transmitted power of the reference signal, the receiver UE may determine the path loss by any one of the above three methods, thereby determining the transmitted power in which V2X communication is conducted between the sender UE and the receiver UE based on the path loss, and achieving power control of signal transmission.

It is noted that any one of the above method of obtaining the path loss may replace the method of obtaining the path loss in the embodiment shown in FIG. 3 to become a separate embodiment which can be implemented without relying on the condition of "when the first UE receives the reference signal but does not receive the transmitted power of the reference signal; or, the first UE does not receive the reference signal but receives the transmitted power of the reference signal; or, the first UE does not receive the reference signal and the transmitted power of the reference signal" and the like, and always implemented by the method of controlling a transmitted power of a sidelink communication by any one of the methods of obtaining the path loss.

Figure 4:
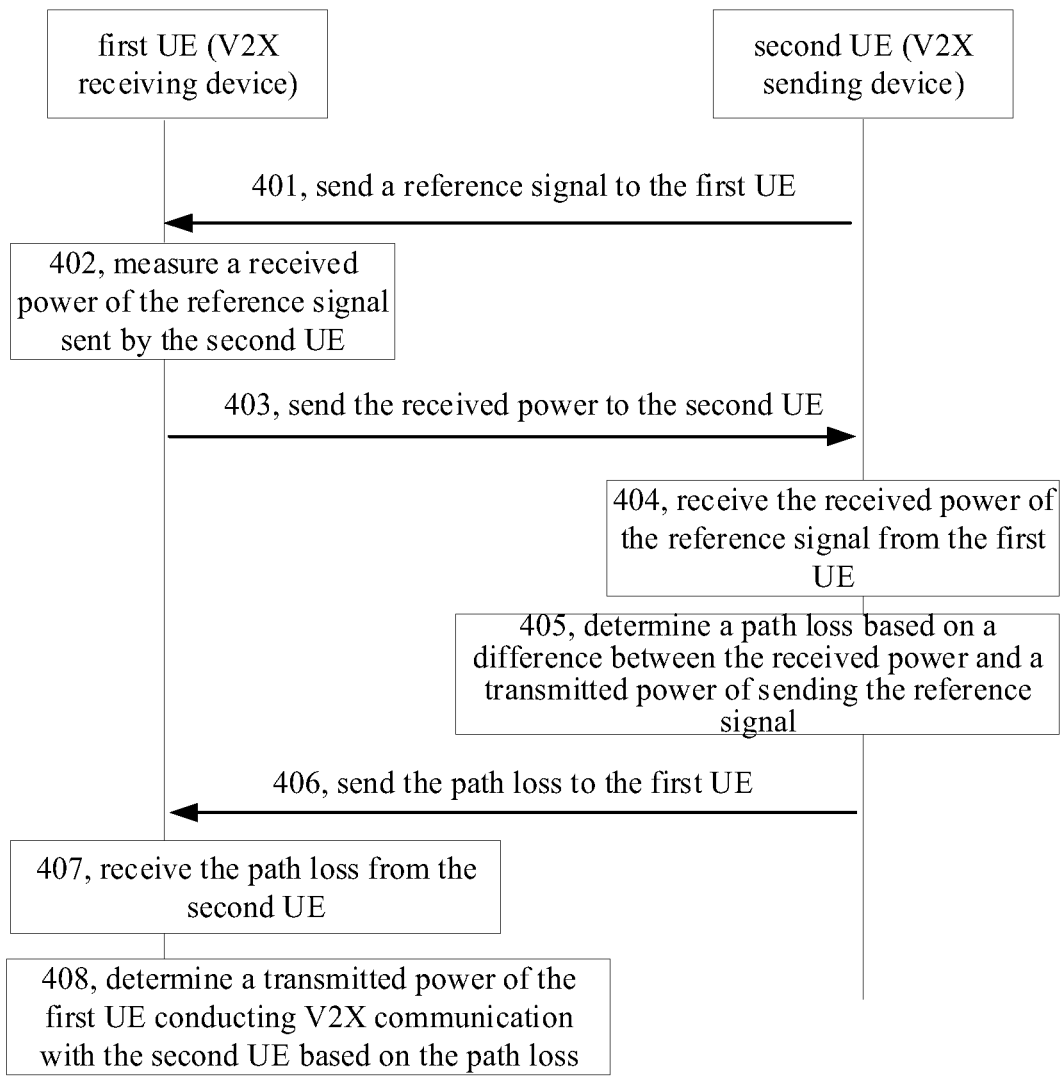
FIG. 4 is a flowchart illustrating a method for controlling a transmitted power of a sidelink communication according to another embodiment of the present disclosure.

In the embodiments shown in FIGS. 2 and 3, the path loss for the first UE conducting V2X communication with the second UE is calculated by the first UE. The path loss for the first UE conducting V2X communication with the second UE may also be calculated by the second UE and then sent to the first UE. Illustratively, as shown in FIG. 4, the steps are described below.

At step 401, the second UE sends a reference signal to the first UE.

The second UE sends a reference signal of a unicast communication to the first UE.

At step 402, the first UE measures a received power of the reference signal sent by the second UE.

The first UE measures the received power of receiving the reference signal of the unicast communication sent by the second UE.

At step 403, the first UE sends the received power to the second UE.

The first UE sends the received power of the reference signal of the unicast communication to the second UE.

At step 404, the second UE receives the received power of the reference signal from the first UE.

The received power is a received power measured by the first UE when the first UE receives the reference signal.

The second UE receives the received power of the reference signal of the unicast communication from the first UE.

At step 405, the second UE determines a path loss based on a difference between the received power and a transmitted power of sending the reference signal.

The second UE determines the difference between the received power and the transmitted power of the reference signal of the unicast communication as the path loss.

At step 406, the second UE sends the path loss to the first UE.

Merely illustratively, the second UE may send second control information to the first UE, where the second control information includes the path loss.

Merely illustratively, the second control information may include at least one of:

physical layer control information on a sidelink;

control information of a media access control (MAC) layer;

control information of a radio resource control (RRC) layer.

Merely illustratively, the second UE may send the path loss to the first UE in one of the following manners:

sending, by the second UE, the second control information to the first UE through a physical sidelink control channel (PSCCH); or, sending, by the second UE, the second control information to the first UE through a physical sidelink shared channel (PSSCH).

At step 407, the first UE receives the path loss from the second UE.

The path loss is determined by the second UE for the first UE conducting V2X communication with the second UE.

Merely illustratively, the first UE receives the second control information from the second UE, where the second control information includes the path loss.

Merely illustratively, the second control information includes at least one of:

physical layer control information on a sidelink;

control information of a media access control (MAC) layer;

control information of a radio resource control (RRC) layer.

Merely illustratively, the first UE receives the second control information from the second UE in any one of the following manners:

receiving, by the first UE, the second control information sent by the second UE through a physical sidelink control channel (PSCCH); or, receiving, by the first UE, the second control information sent by the second UE through a physical sidelink shared channel (PSSCH).

At step 408, the first UE determines a transmitted power of the first UE conducting V2X communication with the second UE based on the path loss.

In one word, in the method for controlling a transmitted power of a sidelink communication according to the embodiments of the present disclosure, the second UE sends a reference signal to the first UE; the first UE measures a received power of receiving the reference signal and sends the received power to the second UE; the second UE determines a path loss and sends the path loss to the first UE; the first UE determines a transmitted power in which V2X communication is conducted between the first UE and the second UE based on the path loss. In this method, the sender UE determines the path loss and sends the path loss to the receiver UE, which solves the problem that the receiver UE cannot estimate the path loss based directly on the measuring result, such that the receiver UE can perform power control of signal transmission based on the path loss. For example, the receiver UE can achieve power control of feedback transmission in a sidelink communication by the above method.

It is noted that, based on the embodiment of FIG. 4, when the second UE calculates the path loss of a sidelink communication between the first UE and the second UE, if the first UE does not receive the reference signal from the second UE, the first UE may determine the path loss by the methods in the following two circumstances.

In a first circumstance, a first communication and a second communication are conducted between the first UE and the second UE; the first communication is a first unicast communication and the second communication is a second unicast communication.

In a second circumstance, a first communication and a second communication are conducted between the first UE and the second UE; the first communication is at least one of a first multicast communication and a first broadcast communication, and the second communication is the second unicast communication.

Figure 5:
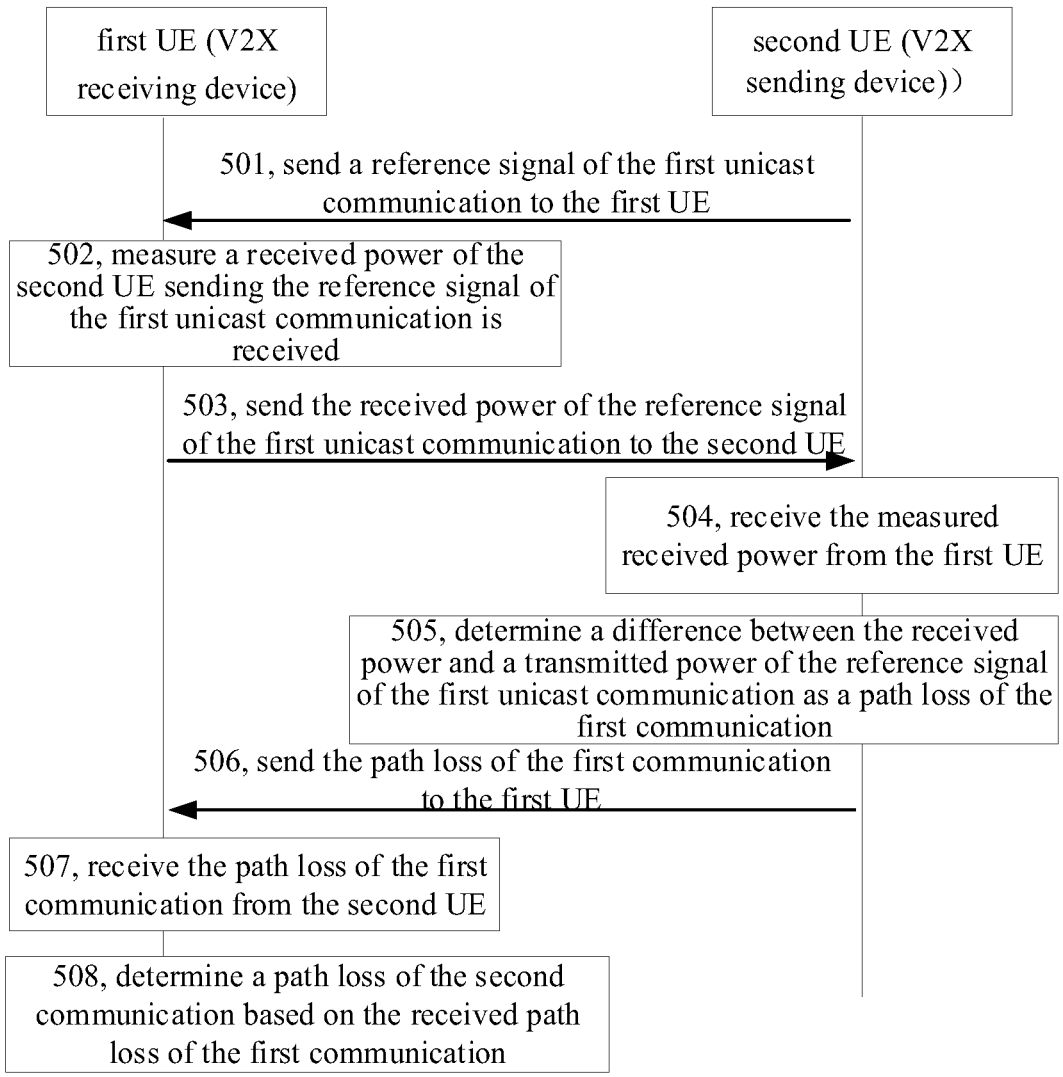
FIG. 5 is a flowchart illustrating a method for controlling a transmitted power of a sidelink communication according to another embodiment of the present disclosure.

In the first circumstance, as shown in FIG. 5, the first UE determines the path loss of the second communication in the following illustrative step.

At step 501, the second UE sends a reference signal of the first unicast communication to the first UE.

At step 502, the first UE measures a received power of receiving the reference signal of the first unicast communication sent by the second UE.

At step 503, the first UE sends the received power of the reference signal of the first unicast communication to the second UE.

At step 504, the second UE receives the measured received power from the first UE.

At step 505, the second UE determines a difference between the received power and a transmitted power of the reference signal of the first unicast communication as a path loss of the first communication.

At step 506, the second UE sends the path loss of the first communication to the first UE.

At step 507, the first UE receives the path loss of the first communication from the second UE.

At step 508, the first UE determines a path loss of the second communication based on the received path loss of the first communication.

Merely illustratively, the first UE determines the received path loss of the first communication as the path loss of the second communication.

Merely illustratively, at least two first unicast communications are included between the first UE and the second UE; the first UE determines the path loss of the second communication based on the received path losses of at least two first unicast communications.

Illustratively, the first UE obtains the path loss of the second communication by performing weighted averaging for the path losses of at least two first unicast communications; or, the first UE determines the path loss of the second communication randomly from the path losses of at least two first unicast communications.

For example, the path losses of two first unicast communications received by the first UE from the second UE are a first path loss and a second path loss respectively, and the first UE determines an average value of the first path loss and the second path loss as the path loss of the second communication.

In one word, in the method of controlling a transmitted power of a sidelink communication according to the embodiments of the present disclosure, when the receiver UE does not receive the reference signal, the receiver UE may determine the path loss of the present communication based on the path loss of another unicast communication between the receiver UE and the sender UE, thereby determining the transmitted power in which V2X communication is conducted between the sender UE and the receiver UE based on the path loss, and achieving power control of signal transmission.

Figure 6:
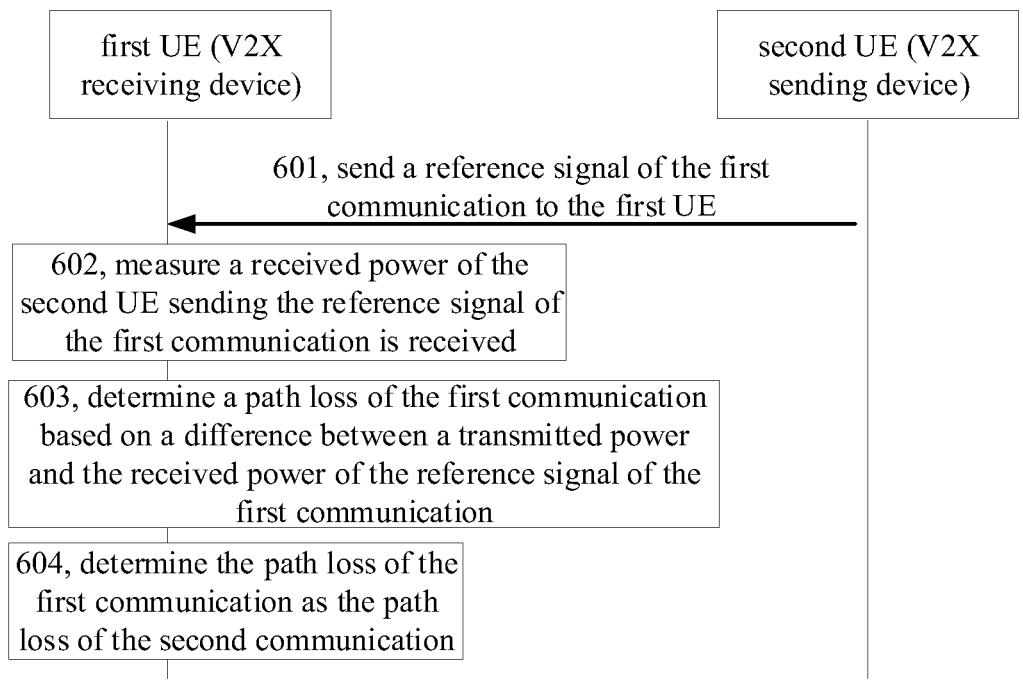
FIG. 6 is a flowchart illustrating a method for controlling a transmitted power of a sidelink communication according to another embodiment of the present disclosure.

In the second circumstance, as shown in FIG. 6, the first UE determines the path loss of the second communication in the following illustrative steps.

At step 601, the second UE sends a reference signal of the first communication to the first UE.

At step 602, the first UE measures a received power of receiving the reference signal of the first communication sent by the second UE.

At step 603, the first UE determines a path loss of the first communication based on a difference between a transmitted power and the received power of the reference signal of the first communication.

The first communication includes the first multicast communication, or the first broadcast communication, or the first multicast communication and the first broadcast communication. Merely illustratively, a transmitted power of the first multicast communication or the first broadcast communication is preconfigured, or predefined or defaulted.

Merely illustratively, V2X communication conducted between the first UE and the second UE includes at least two first communications; the first UE determines at least two candidate path losses of the first communications respectively based on a difference between the transmitted power and the received power of the reference signals of at least two first communications. The first UE determines the path loss of the first communication from the at least two candidate path losses.

Merely illustratively, the first UE determines the path loss of the first communication from at least two candidate path losses based on a priority sequence; or, the first UE obtains the path loss of the first communication by performing weighted averaging for the at least two candidate path losses; or, the first UE determines the path loss of the first communication randomly from the at least two candidate path losses.

Illustratively, the first UE determines three candidate path losses, which are a first candidate path loss and a second candidate path loss of the first multicast communication, and a third candidate path loss of the first broadcast communication; a priority sequence of multicast and broadcast is stored in the first UE, for example, multicast>broadcast, and the first UE excludes the third candidate path loss based on the priority sequence, and, for the first candidate path loss and the second candidate path loss, determines an average value of the first candidate path loss and the second candidate path loss as the path loss of the first communication.

At step 604, the first UE determines the path loss of the first communication as the path loss of the second communication.

The second communication includes the second unicast communication. Therefore, the corresponding combinations of the first communication and the second communication may include any one of:

the first communication includes the first multicast communication, and the second communication includes the second unicast communication;

the first communication includes the first broadcast communication, and the second communication includes the second unicast communication;

the first communication includes the first multicast communication and the first broadcast communication, and the second communication includes the second unicast communication.

In one word, in the method of controlling a transmitted power of a sidelink communication according to the embodiments of the present disclosure, when the receiver UE does not receive the reference signal, the receiver UE may determine the path loss of the present communication based on the path loss of another multicast and/or broadcast communication between the receiver UE and the sender UE, thereby determining the transmitted power in which V2X communication is conducted between the sender UE and the receiver UE based on the path loss, and achieving power control of signal transmission.

Figure 7:
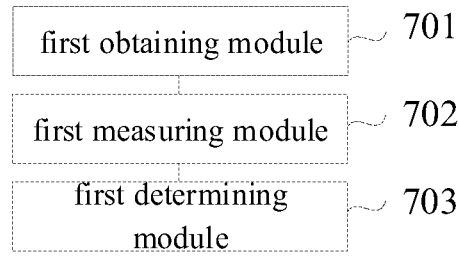
FIG. 7 is a block diagram illustrating an apparatus for controlling a transmitted power of a sidelink communication according to an embodiment of the present disclosure.

FIG. 7 shows an apparatus for controlling a transmitted power of a sidelink communication according to an embodiment of the present disclosure. The apparatus is applied to a V2X. The apparatus may be implemented as part or all of a terminal by software or hardware or combination of both. The apparatus includes:

a first obtaining module 701, configured to obtain a transmitted power of a second UE sending a reference signal;

a first measuring module 702, configured to measure a received power of receiving the reference signal sent by the second UE;

a first determining module 703, configured to determine a path loss based on a difference between the transmitted power and the received power of the reference signal;

wherein the first determining module 703 is configured to determine a transmitted power of the first UE conducting V2X communication with the second UE based on the path loss.

In some embodiments, the first obtaining module 701 is configured to receive first control information from the second UE, wherein the first control information includes the transmitted power of the reference signal.

In some embodiments, the first control information includes at least one of:

physical layer control information on a sidelink;

control information of a media access control (MAC) layer;

control information of a radio resource control (RRC) layer.

In some embodiments, the first obtaining module 701 is configured to receive the first control information sent by the second UE through a physical sidelink control channel (PSCCH); or, receive the first control information sent by the second UE through a physical sidelink shared channel (PSSCH).

In some embodiments, the first obtaining module 701 is configured to obtain a transmitted power of the reference signal configured by an access network device; or, obtain a pre-configured transmitted power of the reference signal; or, obtain a pre-defined transmitted power of the reference signal.

In some embodiments, a first communication and a second communication are conducted between the first UE and the second UE, and the reference signal is a reference signal of the first communication.

The first determining module 703 is configured to determine a path loss of the first communication based on a difference between a transmitted power and a received power of the reference signal of the first communication; determine the path loss of the first communication as the path loss of the second communication.

In some embodiments, the first communication includes a first unicast communication and the second communication comprises a second unicast communication;

or, the first communication includes a first multicast communication, and the second communication includes the second unicast communication;

or, the first communication includes a first broadcast communication, and the second communication includes the second unicast communication;

or, the first communication includes the first unicast communication and the first multicast communication, and the second communication includes the second unicast communication;

or, the first communication includes the first unicast communication and the first broadcast communication, and the second communication includes the second unicast communication;

or, the first communication includes the first multicast communication and the first broadcast communication, and the second communication includes the second unicast communication;

or, the first communication includes the first unicast communication, the first multicast communication, and the first broadcast communication, and the second communication includes the second unicast communication.

In some embodiments, V2X communication conducted between the first UE and the second UE includes at least two first communications.

the first determining module 703 is configured to determine at least two candidate path losses of the first communications respectively according to the differences between the transmitted powers and the received powers of the reference signals of at least two first communications; determine the path loss of the first communication from the at least two candidate path losses.

In some embodiments, the first determining module 703 is configured to: determine the path loss of the first communication from the at least two candidate path losses based on a priority sequence; or, obtain the path loss of the first communication by performing weighted averaging for the at least two candidate path losses; or, determine the path loss of the first communication randomly from the at least two candidate path losses.

In some embodiments, when the first UE does not receive the reference signal from the second UE, the first obtaining module 701 is further configured to: obtain the path loss configured by the access network device; or, obtain the pre-configured path loss; or, obtain the pre-defined path loss.

In one word, in the apparatus for controlling a transmitted power of a sidelink communication according to the embodiments of the present disclosure, when V2X communication is conducted between the first UE and the second UE, the first UE obtains the transmitted power of the reference signal sent by the second UE and measures a received power of the second UE sending the reference signal is received; the first UE determines a path loss based on the difference between the transmitted power and the received power of the reference signal, and determines a transmitted power of the first UE conducting V2X communication with the second UE based on the path loss. This method solves the problem that because the transmitted power of the signal of the sender UE is variable, the receiver UE cannot estimate the path loss based directly on the measuring result, such that the receiver UE can performs power control of signal transmission based on the path loss.

Figure 8:
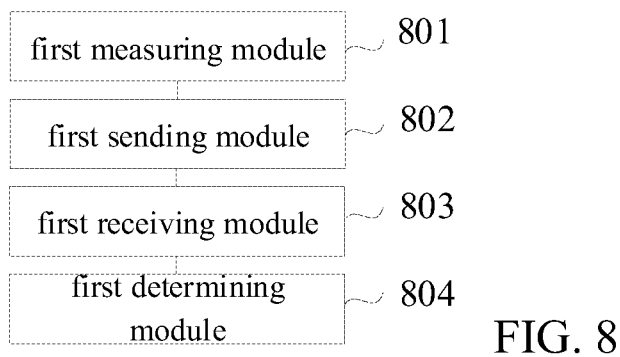
FIG. 8 is a block diagram illustrating an apparatus for controlling a transmitted power of a sidelink communication according to another embodiment of the present disclosure.

FIG. 8 shows an apparatus for controlling a transmitted power of a sidelink communication according to an embodiment of the present disclosure. The apparatus is applied to a V2X and may be implemented as part or all of a terminal by software or hardware or combination of both. The apparatus includes:

a first measuring module 801, configured to measure a received power of a reference signal sent by a second UE;

a first sending module 802, configured to send the received power to the second UE;

a first receiving module 803, configured to receive a path loss from the second UE, wherein the path loss is determined by the second UE for the first UE conducting V2X communication with the second UE;

a first determining module 804, configured to determine a transmitted power of the first UE conducting V2X communication with the second UE based on the path loss.

In some embodiments, the first receiving module 803 is configured to receive second control information from the second UE, wherein the second control information includes the path loss.

In some embodiments, the second control information includes at least one of:

physical layer control information on a sidelink;

control information of a media access control (MAC) layer;

control information of a radio resource control (RRC) layer.

In some embodiments, the first receiving module 803 is configured to receive the second control information sent by the second UE through a physical sidelink control channel (PSCCH); or, receive the second control information sent by the second UE through a physical sidelink shared channel (PSSCH).

In some embodiments, a first communication and a second communication are conducted between the first UE and the second UE, and the reference signal is a reference signal of the first communication;

the first determining module 804 is configured to determine a path loss of the first communication based on a difference between a transmitted power and a received power of the reference signal of the first communication; determine the path loss of the first communication as the path loss of the second communication.

In some embodiments, the first communication includes a first multicast communication and a second communication includes a second unicast communication;

or, the first communication includes a first broadcast communication, and the second communication includes the second unicast communication;

or, the first communication includes the first multicast communication and the first broadcast communication, and the second communication includes the second unicast communication.

In some embodiments, V2X communication conducted between the first UE and the second UE includes at least two first communications;

the first determining module 804 is configured to determine at least two candidate path losses of the first communications respectively according to the differences between the transmitted powers and the received powers of the reference signals of at least two first communications; determine the path loss of the first communication from the at least two candidate path losses.

In some embodiments, the first determining module 804 is configured to determine the path loss of the first communication from the at least two candidate path losses based on a priority sequence; or, obtain the path loss of the first communication by performing weighted averaging for the at least two candidate path losses; or, determine the path loss of the first communication randomly from the at least two candidate path losses.

In some embodiments, a first communication and a second communication are conducted between the first UE and the second UE;

the first determining module 804 is configured to determine the received path loss of the first communication as the path loss of the second communication; wherein the first communication includes the first unicast communication and the second communication includes the second unicast communication.

In one word, in the apparatus for controlling a transmitted power of a sidelink communication according to the embodiments of the present disclosure, when the receiver UE does not receive the reference signal or the transmitted power of the reference signal from the sender UE, the receiver UE may determine the path loss of the present communication based on the path loss of another communication between the receiver UE and the sender UE, thereby determining the transmitted power in which V2X communication is conducted between the sender UE and the receiver UE based on the path loss, and achieving power control of signal transmission.

Figure 9:
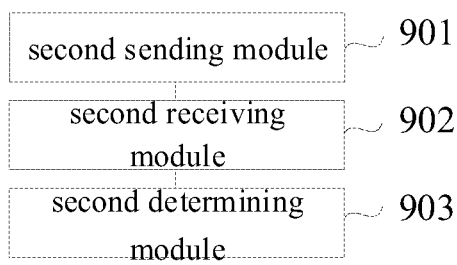
FIG. 9 is a block diagram illustrating an apparatus for controlling a transmitted power of a sidelink communication according to an embodiment of the present disclosure.

FIG. 9 shows an apparatus for controlling a transmitted power of a sidelink communication according to another embodiment of the present disclosure. The apparatus is applied to a V2X and can be implemented as part or all of a terminal by software or hardware or combination of both. The apparatus includes:

a second sending module 901, configured to send a reference signal to a first UE;

a second receiving module 902, configured to receive a received power of the reference signal from the first UE, wherein the received power is a received power measured by the first UE when the first UE receives the reference signal;

a second determining module 903, configured to determine a path loss based on a difference between the received power and a transmitted power of sending the reference signal;

wherein the second sending module 901 is configured to send the path loss to the first UE.

In some embodiments, the second sending module 901 is configured to send second control information to the first UE, wherein the second control information includes the path loss.

In some embodiments, the second sending module 901 is configured to send the second control information to the first UE through a physical sidelink control channel (PSCCH); or, send the second control information to the first UE through a physical sidelink shared channel (PSSCH).

In some embodiments, the second control information includes at least one of:

physical layer control information on a sidelink;

control information of a media access control (MAC) layer;

control information of a radio resource control (RRC) layer.

In some embodiments, a first communication and a second communication are conducted between the first UE and the second UE;

the second sending module 901 is configured to send a reference signal of the first communication to the first UE; wherein the reference signal of the first communication is used by the first UE to determine a transmitted power of the first UE conducting the second communication with the second UE.

In some embodiments, the second sending module 901 is configured to send a transmitted power of the reference signal to the first UE; wherein the transmitted power of the reference signal is used by the first UE to determine a transmitted power of the first UE conducting V2X communication with the second UE.

In one word, the apparatus for controlling a transmitted power of a sidelink communication according to the embodiments of the present disclosure sends a reference signal to the first UE; the first UE measures a received power of receiving the reference signal, and sends the received power to the apparatus; the apparatus determines a path loss and sends the path loss to the first UE; the first UE determines a transmitted power in which V2X communication is conducted with the second UE based on the path loss. In this method, the sender UE determines the path loss and sends it to the receiver UE and thus problem that the receiver UE cannot estimate the path loss based directly on the measuring result is solved, such that the receiver UE can perform power control of signal transmission based on the path loss.

Figure 10:
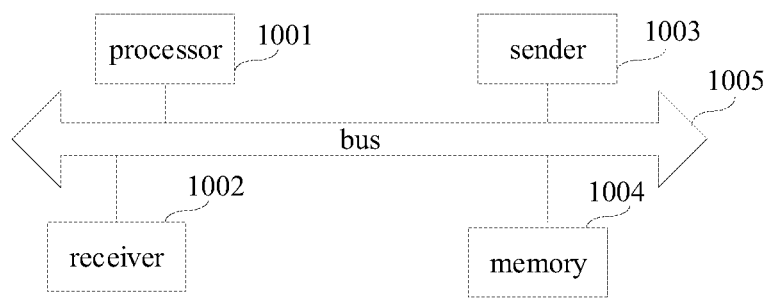
FIG. 10 is a structural schematic diagram illustrating a terminal according to an embodiment of the present disclosure.

FIG. 10 is a structural schematic diagram illustrating a terminal according to an embodiment of the present disclosure. The terminal includes a processor 1001, a receiver 1002, a sender 1003, a memory 1004 and a bus 1005.

The processor 1001 includes one or more processing cores and the processor 1001 runs software program or modules to execute various functional applications and information processing.

The receiver 1002 and the sender 1003 may be implemented as a communication component which may be one communication chip.

The memory 1004 is connected with the processor 1001 via the bus 1005.

The memory 1004 may be used to store at least one instruction, and the processor 1001 is used to execute the at least one instruction to implement various steps of the above method embodiments.

Furthermore, the memory 1004 may be implemented by any type of volatile or non-volatile storage device or combination thereof. The volatile or non-volatile storage device include but not limited to: magnetic disk, or compact disk, an Electrically-Erasable Programmable Read-Only Memory (EEPROM), an Erasable Programmable Read-Only Memory (EPROM), a Static Random Access Memory (SRAM), a Read Only Memory (ROM), a magnetic memory, flash memory and a Programmable Read-Only Memory (PROM).

In an exemplary embodiment, there is further provided a non-transitory computer readable storage medium including instructions, for example, a memory including instructions. The above instructions may be executed by a processor of a terminal to implement the above method of controlling a transmitted power of a sidelink communication. For example, the non-transitory computer readable storage medium may be Read Only Memory (ROM), Random Access Memory (RAM), CD-ROM, magnetic tape, floppy disk, optical data storage device and the like.

Provided is a non-transitory computer readable storage medium. When the instructions in the non-transitory computer readable storage medium are executed by a processor of the terminal, the terminal is enabled to implement the above method of controlling a transmitted power of a sidelink communication.

An embodiment of the present disclosure further provides a communication system including the above V2X sending device and the above V2X receiving device.

An embodiment of the present disclosure further provides a computer readable storage medium storing at least one instruction, at least one segment of program, a code set or an instruction set, and the at least one instruction, the at least one segment of program, the code set or the instruction set is loaded and executed by a processor to implement the method of controlling a transmitted power of a sidelink communication provided by the above method embodiments.

It is understood that "plurality" in the present disclosure refers to two or more. The "and/or" is used to describe association relationship of associated objects and represent three relationships, for example, A and/or B may represent that A exists alone, both A and B exist at the same time, and B exists alone. The character "/" generally represents an "or" relationship of the objects associated back and forth.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method for controlling a transmitted power of a sidelink communication, being applied to a first user equipment (UE) in a vehicle to everything (V2X) and comprising:
    obtaining, by the first UE, a transmitted power of a second UE sending a reference signal;
    measuring, by the first UE, a received power of receiving the reference signal sent by the second UE;
    determining, by the first UE, a path loss based on a difference between the first transmitted power and the received power of the reference signal;
    determining, by the first UE and based on the path loss, a second transmitted power of the first UE conducting V2X communication with the second UE,
    wherein determining, by the first UE, the path loss based on the difference between the first transmitted power and the received power of the reference signal, comprises: determining, by the first UE, a path loss of a first communication from at least two candidate path losses based on a priority sequence.

2. The method of claim 1, wherein obtaining, by the first UE, the first transmitted power of the second UE sending the reference signal comprises:
    receiving, by the first UE, first control information from the second UE, wherein the first control information comprises the first transmitted power of the reference signal.

3. The method of claim 2, wherein the first control information comprises at least one of:
    physical layer control information on a sidelink;
    control information of a media access control (MAC) layer; and
    control information of a radio resource control (RRC) layer.

4. The method of claim 2, wherein receiving, by the first UE, the first control information from the second UE comprises at least one of the following:
    receiving, by the first UE, the first control information sent by the second UE through a physical sidelink control channel (PSCCH); and
    receiving, by the first UE, the first control information sent by the second UE through a physical sidelink shared channel (PSSCH).

5. The method of claim 1, wherein obtaining, by the first UE, the transmitted power of the second UE sending a reference signal further comprises at least one of the following:
    obtaining, by the first UE, a transmitted power of the reference signal configured by an access network device;
    obtaining, by the first UE, a pre-configured transmitted power of the reference signal; and
    obtaining, by the first UE, a pre-defined transmitted power of the reference signal.

6. The method of claim 1, wherein the first communication and a second communication are conducted between the first UE and the second UE, and the reference signal is a reference signal of the first communication;
    determining, by the first UE, the path loss based on the difference between the first transmitted power and the received power of the reference signal comprises:
    determining, by the first UE, the path loss of the first communication based on the difference between the first transmitted power and the received power of the reference signal of the first communication;
    determining, by the first UE, the path loss of the first communication as the path loss of the second communication.

7. The method of claim 6, wherein,
    the first communication comprises at least one of the following: first unicast communication, first multicast communication and first broadcast communication; and
    the second communication comprises a second unicast communication.

8. The method of claim 6, wherein when V2X communication conducted between the first UE and the second UE comprises at least two first communications;
    determining, by the first UE, the path loss of the first communication based on the difference between the transmitted power and the received power of the reference signal of the first communication comprises:
    determining, by the first UE, at least two candidate path losses of the first communications respectively according to differences between transmitted powers and received powers of reference signals of the at least two first communications;
    determining, by the first UE, the path loss of the first communication from the at least two candidate path losses.

9. The method of claim 8, wherein determining, by the first UE, the path loss of the first communication from the at least two candidate path losses, comprises at least one of the following:

obtaining, by the first UE, the path loss of the first communication, by performing weighted averaging for the at least two candidate path losses; and determining, by the first UE, the path loss of the first communication randomly from the at least two candidate path losses.

10. The method of claim 1, wherein when the first UE does not receive the reference signal from the second UE, the method further comprises at least one of the following:

obtaining, by the first UE, the path loss configured by an access network device;

obtaining, by the first UE, a pre-configured path loss as the path loss; and obtaining, by the first UE, a pre-defined path loss as the path loss.

11. A method of controlling a transmitted power of a sidelink communication, being applied to a first user equipment (UE) in a vehicle to everything (V2X) and comprising:

measuring, by the first UE, a received power of a reference signal sent by a second UE;

sending, by the first UE, the received power to the second UE;

receiving, by the first UE, a path loss from the second UE, wherein the path loss is determined by the second UE for the first UE conducting V2X communication with the second UE;

determining, by the first UE and based on the path loss, a transmitted power of the first UE conducting V2X communication with the second UE, wherein the method further comprises: determining, by the first UE, a path loss of a first communication from at least two candidate path losses based on a priority sequence.

12. The method of claim 11, wherein receiving, by the first UE, the path loss from the second UE comprises:

receiving, by the first UE, second control information from the second UE, wherein the second control information comprises the path loss.

13. The method of claim 12, wherein the second control information comprises at least one of:

physical layer control information on a sidelink;

control information of a media access control (MAC) layer;

control information of a radio resource control (RRC) layer.

14. The method of claim 12, wherein receiving, by the first UE, the path loss from the second UE comprises at least one of the following:

receiving, by the first UE, the second control information sent by the second UE through a physical sidelink control channel (PSCCH); and receiving, by the first UE, the second control information sent by the second UE through a physical sidelink shared channel (PSSCH).

15. The method of claim 11, wherein the first communication and a second communication are conducted between the first UE and the second UE, and the reference signal is a reference signal of the first communication;

the method further comprises:

determining, by the first UE, the path loss of the first communication based on a difference between the transmitted power and the received power of the reference signal of the first communication;

determining, by the first UE, the path loss of the first communication as the path loss of the second communication.

16. The method of claim 15, wherein, the first communication comprises at least one of first multicast communication and first broadcast communication; and the second communication comprises a second unicast communication.

17. The method of claim 15, wherein V2X communication conducted between the first UE and the second UE comprises at least two first communications;

determining, by the first UE, the path loss of the first communication based on the difference between the transmitted power and the received power of the reference signal of the first communication comprises:

determining, by the first UE, at least two candidate path losses of the first communications respectively according to differences between transmitted powers and received powers of reference signals of the at least two first communications;

determining, by the first UE, the path loss of the first communication from the at least two candidate path losses.

18. The method of claim 17, wherein determining, by the first UE, the path loss of the first communication from the at least two candidate path losses, comprises at least one of the following:

obtaining, by the first UE, the path loss of the first communication, by performing weighted averaging for the at least two candidate path losses; and determining, by the first UE, the path loss of the first communication randomly from the at least two candidate path losses.

19. The method of claim 11, wherein a first communication and a second communication are conducted between the first UE and the second UE;

the method further comprises:

determining, by the first UE, the received path loss of the first communication as the path loss of the second communication; wherein the first communication comprises a first unicast communication and the second communication comprises a second unicast communication.

20. A terminal, comprising:

a processor;

a transceiver connected to the processor;

wherein the processor is configured to:

obtain, by the first UE, a first transmitted power of a second UE sending a reference signal;

measure, by the first UE, a received power of receiving the reference signal sent by the second UE;

determine, by the first UE, a path loss based on a difference between the first transmitted power and the received power of the reference signal;

determine, by the first UE and based on the path loss, a second transmitted power of the first UE conducting V2X communication with the second UE; and measure, by the first UE, a received power of a reference signal sent by a second UE;

send, by the first UE, the received power to the second UE;

receive, by the first UE, a path loss from the second UE, wherein the path loss is determined by the second UE for the first UE conducting V2X communication with the second UE;

determine, by the first UE and based on the path loss, a transmitted power of the first UE conducting V2X communication with the second UE, wherein determining, by the first UE, the path loss based on the difference between the first transmitted power and the received power of the reference signal, comprises: determining, by the first UE, a path loss of a first communication from at least two candidate path losses based on a priority sequence.

\* \* \* \* \*